US012648651B2

(12) United States Patent
Youngdo et al.

(10) Patent No.: US 12,648,651 B2
(45) Date of Patent: Jun. 9, 2026

(54) MATTRESS FOUNDATIONS

(71) Applicant: Zinus Inc., Gyeonggi-do (KR)

(72) Inventors: Jung Youngdo, Gyeonggi-do (KR);
Cha Doohwan, Gyeonggi-do (KR)

(73) Assignee: Zinus Inc., Gyeonggi-do (KR)

( * ) Notice: Subject to any disclaimer, the term of this
patent is extended or adjusted under 35
U.S.C. 154(b) by 466 days.

(21) Appl. No.: 18/062,282

(22) Filed: Dec. 6, 2022

(65) Prior Publication Data

US 2023/0180939 A1 Jun. 15, 2023

(30) Foreign Application Priority Data

Dec. 9, 2021 (CN) .......................... 202123087222.6

(51) Int. Cl.
*A47C 19/00* (2006.01)
*F16B 12/26* (2006.01)
*F16B 12/54* (2006.01)

(52) U.S. Cl.
CPC ............ *A47C 19/005* (2013.01); *F16B 12/26*
(2013.01); *F16B 12/54* (2013.01)

(58) Field of Classification Search
CPC ..... A47C 19/005; A47C 19/025; F16B 12/26;
F16B 12/54; F16B 12/50; F16B 12/56;
F16B 12/38; F16B 7/042; F16B 7/105
See application file for complete search history.

(56) References Cited

U.S. PATENT DOCUMENTS

| | | | | |
|---|---|---|---|---|
| 2,273,791 A | * | 2/1942 | Wirgin | F16B 7/105 |
| | | | | 248/188.5 |
| 7,003,822 B1 | * | 2/2006 | Sheehy | A47C 19/005 |
| | | | | 5/200.1 |
| 7,882,581 B2 | | 2/2011 | Felix, Jr. et al. | |
| 8,584,277 B1 | * | 11/2013 | Roberts | F16B 12/46 |
| | | | | 5/1 |
| 11,076,703 B2 | * | 8/2021 | Choi | A47C 19/122 |
| 11,185,169 B2 | * | 11/2021 | Choi | F16B 12/56 |
| 2005/0249545 A1 | * | 11/2005 | Tsai | E04H 15/50 |
| | | | | 403/109.3 |
| 2007/0151026 A1 | | 7/2007 | Felix | |
| 2010/0154118 A1 | * | 6/2010 | Pearce | A47C 19/005 |
| | | | | 53/474 |
| 2014/0208506 A1 | * | 7/2014 | Bartelsmeyer | A47C 19/005 |
| | | | | 5/400 |

(Continued)

FOREIGN PATENT DOCUMENTS

| | | |
|---|---|---|
| CN | 204181283 U | 3/2015 |
| CN | 217039471 U | 7/2022 |

*Primary Examiner* — Matthew Troutman
*Assistant Examiner* — Alison N Labarge
(74) *Attorney, Agent, or Firm* — Wilson Sonsini Goodrich
& Rosati

(57) ABSTRACT

The present disclosure provides a mattress foundation. The
mattress foundation comprises one or more side frames,
wherein the side frames comprise one or more spring
buttons; and one or more end connectors, wherein the end
connectors comprise a receiving opening and an aperture;
wherein the end connectors are configured to removably
couple to one or more side frames by inserting the side
frames into the receiving opening and allow the spring
buttons to be released into the apertures to form a coupled
state of the side frame and the end connector; and wherein
the side frames are uniform in dimension along a cross-
section direction of the side frames.

20 Claims, 5 Drawing Sheets

(56)                    References Cited

U.S. PATENT DOCUMENTS

2016/0238049  A1*    8/2016  Bruneel  .................. F16B 7/105
2018/0055235  A1*    3/2018  Choi  ...................... A47C 19/12
2018/0352966  A1*   12/2018  Bitzounis  ................ A47C 5/10
2023/0057573  A1*    2/2023  Johnson  .............. A47C 19/005

* cited by examiner

341

212

3411

MATTRESS FOUNDATIONS

CROSS-REFERENCE

This application claims the benefit of and priority to Chinese Patent Application No. 202123087222.6 filed on Dec. 9, 2021, which is incorporated herein by reference in its entirety for all purposes.

BACKGROUND

Nowadays, mattresses foundations (e.g., box springs, bed frame assembly, etc.) often consist of components that are assemblable and disassemblable for easy packaging, storage (e.g., in a warehouse, in a user's storage area,) and shipping (e.g., when shipping to a user). After being disassembled for packaging, storage, and shipping, extra steps, tools (e.g., screwdrivers), and/or components (e.g., screws) may be required to assemble the mattress foundations.

SUMMARY

It is desired to have mattresses foundations with components that are easily assemblable and disassemblable for packaging, storage and shipping, without the need of using extra tools and/or components, for example, at the time when taking out from the package and deploying for use.

Recognized herein are various limitations with mattress foundations with one or more components that may need tools to be assembled together for use. Additionally or alternatively, to achieve a small package size of the mattress foundations, the frames for a mattress foundation may be divided along a longitudinal direction, with a middle frame to provide strong support to the structure when deployed for use. The various components will be assembled when deployed for use, normally at a location for use, e.g., a consumer's bedroom. An ordinary household may not possess all the tools for assembling the mattress foundation. The present disclosure aims to address the shortcomings and technical disadvantages of commercially available mattress foundations by providing a mattress foundation with spring buttons to connect different components to eliminate the need of screws and screwdrivers, wherein the mattress foundation is light weighted and can be easily packaged into a compact volume for storage and shipping/transport, without compromising the structural stability, and can improve user experience in the assembling process (e.g., no extra tools needed, etc.) Additionally or alternatively, the present disclosure provides a mattress foundation with side frames that are uniform in dimension along the cross-section direction (i.e., no necking portion). A side frame that is uniform in dimension along the cross-section direction may eliminate the need for extra steps in manufacturing the necking portion, which reduces the costs of general production.

In one aspect, the present disclosure provides a mattress foundation structure comprises one or more side frames, wherein the side frames comprise one or more spring buttons; and one or more end connectors, wherein the end connectors comprise a receiving opening and an aperture; wherein the end connectors are configured to removably couple to one or more side frames by inserting the side frames into the receiving opening and allow the spring buttons to be released into the apertures to form a coupled state of the side frame and the end connector; and wherein the side frames are uniform in dimension along a cross-section direction of the side frames. In some embodiments, the mattress foundation structure further comprises one or more middle frames, wherein the middle frames comprise one or more end portions; and one or more middle connectors, wherein the middle connectors comprise a receiving slot, wherein the receiving slot has a hollow internal shape that is corresponding to a shape of the one or more end portions of the middle frames, wherein the middle connectors are configured to removably couple to one of the end portions of the middle frames by sliding the end portion into the receiving slot of the middle connector. In some embodiments, the middle connectors further comprise one or more receiving openings; and one or more apertures, wherein the middle connectors are configured to removably couple to one or more side frames by inserting the side frames into the receiving openings and allow the spring buttons to be released into the apertures. In some embodiments, the end connectors further comprise a guiding path, wherein the guiding path is configured to provide alignment to insert the side frames into the receiving opening. In some embodiments, the guiding path comprises a non-tilt guiding path and a tilt guiding path, wherein the non-tilt guiding path provides an initial alignment to insert the side frames into the receiving opening, and the tilt guiding path provides inward force pressing the spring button, wherein the spring button is released into the aperture when the side frame passes the tilt guiding path along an insertion direction. In some embodiments, the aperture has a tilt-in edge surrounding the aperture opening to provide extra room for application of force when dissembling the side frame and the end connectors from the coupled state, wherein the application of force pushes the spring button inward to be lower than the aperture edge along the inward direction. In some embodiments, the receiving opening has a hollow internal shape that is corresponding to a cross-section shape of the side frames. In some embodiments, the receiving slot comprises a slot opening on one end of the receiving slot, wherein the slot opening is configured to receive the end portion of the middle frame by facilitating the sliding the end portion into the receiving slot via the slot opening, and wherein the slot opening is further configured to receive an end cap to close the slot opening. In some embodiments, the one or more end connectors are made of plastic. In some embodiments, the one or more middle connectors are made of plastic.

In one aspect, the present disclosure provides a connector assembly for a mattress foundation, wherein the connector assembly comprises a spring button located on an end of a side frame of the mattress foundation, wherein the side frame is uniform in dimension along a cross-section direction of the side frame; a receiving opening, wherein the receiving opening is configured to receive the end of the side frame by insertion, wherein the receiving opening has a hollow internal shape that is corresponding to a cross-section shape of the side frame; and an aperture, wherein the aperture is configured to accommodate the spring button of the side frame when the side frame is inserted into the receiving opening. In some embodiments, the connector assembly further comprises a guiding path, wherein the guiding path is configured to provide alignment to insert the side frame into the receiving opening. In some embodiments, the guiding path comprises a non-tilt guiding path and a tilt guiding path, wherein the non-tilt guiding path provides an initial alignment to insert the side frame into the receiving opening, and the tilt guiding path provides inward force pressing the spring button, wherein the spring button is released into the aperture when the side frame passes the tilt guiding path along an insertion direction. In some embodiments, the aperture has a tilt-in edge surrounding the aperture opening to provide extra room for application of force when dissembling the side frame and the receiving opening from a coupled state, wherein the application of force pushes the spring button inward to be lower than the aperture edge along the inward direction.

In one aspect, the present disclosure provides a connector assembly for a mattress foundation, wherein the connector assembly comprises an end portion of a middle frame of the mattress foundation; and a receiving slot, wherein the receiving slot has a hollow internal shape that is corresponding to a shape of the end portion of the middle frames; wherein the connector assembly is configured to removably couple to the end portion of the middle frame by sliding the end portion into the receiving slot of the middle connector. In some embodiments, the connector assembly further comprises a spring button located on an end of a side frame of the mattress foundation, wherein the side frame is uniform in dimension along a cross-section direction of the side frame; a receiving opening, wherein the receiving opening is configured to receive the end of the side frame by insertion, wherein the receiving opening has a hollow internal shape that is corresponding to a cross-section shape of the side frame; and an aperture, wherein the aperture is configured to accommodate the spring button of the side frame when the side frame is inserted into the receiving opening. In some embodiments, the connector assembly further comprises a guiding path, wherein the guiding path is configured to provide alignment to insert the side frame into the receiving opening. In some embodiments, the guiding path comprises a non-tilt guiding path and a tilt guiding path, wherein the non-tilt guiding path provides an initial alignment to insert the side frame into the receiving opening, and the tilt guiding path provides inward force pressing the spring button, wherein the spring button is released into the aperture when the side frame passes the tilt guiding path along an insertion direction. In some embodiments, the aperture has a tilt-in edge surrounding the aperture opening to provide extra room for application of force when dissembling the side frame and the receiving opening from a coupled state, wherein the application of force pushes the spring button inward to be lower than the aperture edge along the inward direction. In some embodiments, the receiving slot comprises a slot opening on one end of the receiving slot, wherein the slot opening is configured to receive the end portion of the middle frame by facilitating the sliding the end portion into the receiving slot via the slot opening, and wherein the slot opening is further configured to receive an end cap to close the slot opening.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure addresses the shortcomings and technical disadvantages of traditional mattress foundations with screws as connectors, which may compromise ease of use to an end user, weight, transportability, and packageability of the mattress foundations.

Disclosed herein are various examples of mattress foundations and methods of making the same that are improved on ease of use to an end user, weight, transportability, and packageability of the mattress foundations, and can be packed into a compact volume for storage or shipping/transport.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values.

For example, less than or equal to 3, 2, or 1 is equivalent to less than or equal to 3, less than or equal to 2, or less than or equal to 1.

Whenever the term "first," "second," or "third" etc. precedes one or more of the subjects, they do not indicate the sequence, the importance, or the numbers/amount of the subjects; they are used to differentiate one subject and another.

Figure 1:
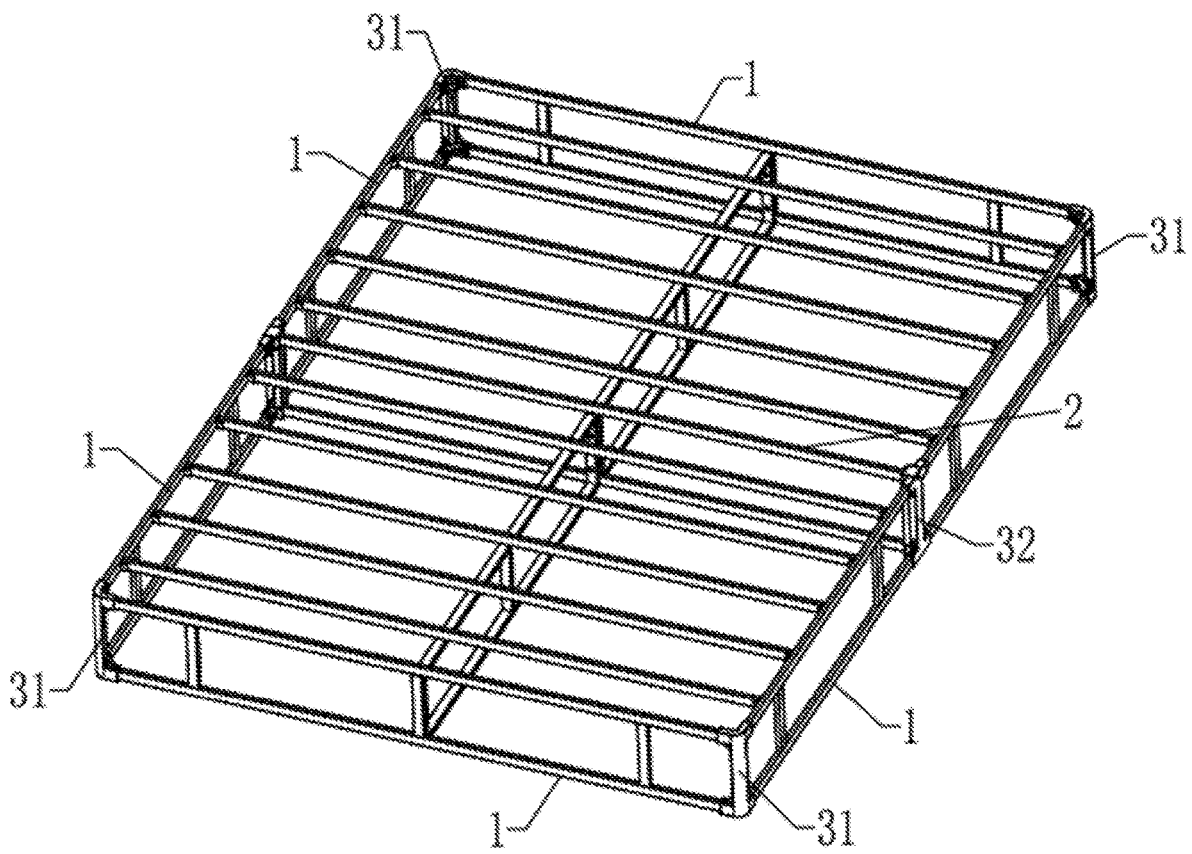
FIG. 1 schematically illustrates a mattress foundation, according to one or more embodiments of the presented disclosure.

FIG. 1 schematically illustrates a mattress foundation 100, according to one or more embodiments of the presented disclosure. As shown in FIG. 1, the mattress foundation 100 may comprise a plurality of side frames 1, at least one middle frame 2, and multiple connector members. In some embodiments, the mattress foundation 100 may only comprise a plurality of side frames 1 and multiple connector members. In some embodiments, the mattress foundation 100 comprises 4 straight side frames 1, which forms a rectangle mattress foundation in the assembled state (e.g., also referred to as a coupled state, a deployed state, etc.). In some embodiments, the side frames 1 may not be a straight frame, i.e., may be a curved shape. For example, a plurality of curved side frames 1, in the assembled state, may form a round shape or an ellipse shape mattress foundation. In some embodiments, the connector members of the mattress foundation 100 may comprise multiple end connectors 31 and/or multiple middle connectors 32. In some embodiments, based on the shape, size, or functionality of the mattress foundation, the use of middle connectors 32 may be eliminated. For example, when the mattress foundation is in round shape or ellipse shape, a plurality of side frames may be connected with one another by end connectors 31. In another example, the mattress foundation may be a fairly small one, e.g., a mattress foundation for a toddler bed. In that case, the mattress foundation may not need a middle frame to provide extra support, and the mattress foundation may eliminate the middle connectors and only rely on the end connectors to couple the side frames together. In some embodiments, the middle connector 32 may connect the middle frame 2 to the side frames 1. Details of the end connectors 31, middle connectors 32, and the mechanism of the assembling process are described herein elsewhere in connection with FIGS. 2, 3, and 4. In some embodiments, the end connectors 31 and/or the middle connectors 32 may be made of lightweight rigid material, for example, plastic. For example, the plastic may comprise acetal, acrylic, polyimide, high impact polystyrene, and linen phenolic, etc. In some embodiments, a material is selected based at least in part on the weight and/or stiffness (i.e., rigidity) of the material, and/or the dimension, function, desired support of the mattress foundation. In some embodiments, the lightweight rigid material may be 0.1, 0.2, 0.3, 0.4, 0.5, 0.6, 0.7, 0.8, 0.9, 1, 2, 3, 4, and 5 gr/cc. The lightweight rigid material may provide sufficient strength to connect one or more frames and yet does not add a significant weight to the mattress foundations. For example, the lightweight rigid material may have a stiffness of 5, 6, 7, 8, 9, 10, 20, 30, 40, 50, 60, 70, 80, 90, 100, 110, 120, 130, 140, 150, 200 MPa. Various of material may be selected to form the connectors, and the selection may be partially based on the desired weight and stiffness.

Figure 2:
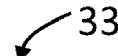
FIG. 2 schematically illustrates a perspective view of a first connector assembly of a mattress foundation of the present disclosure, according to one or more embodiments of the presented disclosure.

FIG. 2 schematically illustrates a perspective view of a first connector assembly 33 of a mattress foundation of the present disclosure. As shown in FIG. 2, the first connector assembly 33 may comprise one or more end portions of the side frames 1, wherein the end portions of the side frames 1 may comprise a button portion 331. In some embodiments, the button portion 331 may comprise a spring button. In some embodiments, the button portion 331 may comprise a spring button with a button and a spring portion, wherein the spring portion may be a spiral spring, a leaf spring, and/or a combination thereof. In some embodiments, the end portion of the side frames 1 may comprise an opening (not explicitly shown in FIG. 2), which allows the button of the button portion 331 to extend through the opening of side frames 1 when an applied force is removed. As shown in FIG. 2, the first connector assembly 33 may comprise the end connector 31 (also shown in connection with FIG. 1). In some embodiments, the end connector 31 may comprise one or more guiding paths 334, one or more receiving openings 332, one or more apertures 333, one or more curved portions 312, and/or an end pole potion 311. In some embodiments, the side frame 1 may be inserted into the receiving opening 332 of the end connector 31 via the guiding path 334, and the button portion 331 may be pressed by the guiding path 334 along the insertion direction 306, and then be biased into the aperture 333 by the force applied by the spring portion of the button portion 331. In some embodiments, the button potion 331 may comprise more than one buttons, for example, 2, 3, 4, 5, 6, 7, 8, 9, 10, etc. In some embodiments, the button portion 331 may comprise two buttons facing away from each other. Correspondingly, the end connectors 31 may comprise more than one apertures 333 to receive the buttons, based on the configuration and corresponding locations of the buttons of the side frame 1. In some embodiments, the curved portions 312 may be a generally right angle (i.e., substantially 90 degrees), for example, when the mattress foundation is a rectangle shape. In some embodiments, the curved portions 312 may form an obtuse angle (i.e., greater than 90 degrees and less than 180 degrees), for example, when the mattress foundation is a round or eclipse shape. In some embodiments, the end pole portion 311 may have a height that is equal to the thickness of the mattress foundation.

As shown in FIG. 2, the side frame 1 may comprise the button portion 331 to couple to the end connectors 31, by the aid of the guiding paths 334, the receiving openings 332, and the apertures 333. In some embodiments, the side frame 1 is uniform in dimension in cross-section, i.e., there is no need to form a necking portion. The receiving opening 332 may be formed with a cross-section with the dimension just big enough to receive the side frame 1. This may reduce the process of manufacturing a necking portion for the side frame 1, which may reduce the costs for manufacturing the side frame 1. In some embodiments, the dimension and shape of side frame 1 may be compatible with the receiving opening 332, i.e., the outer boundary of the side frame 1 may be slightly smaller than the inner boundary of the receiving opening 332. In some embodiments, the gap between the inner boundary of the receiving opening 332 and the outer boundary of side frame 1 may be 0.1 mm, 0.2 mm, 0.3 mm, 0.4 mm, 0.5 mm, 0.6 mm, 0.7 mm, 0.8 mm, 0.9 mm, 1 cm, 2 cm, 3 cm, 4 cm, 5 cm, etc.

Figure 3:
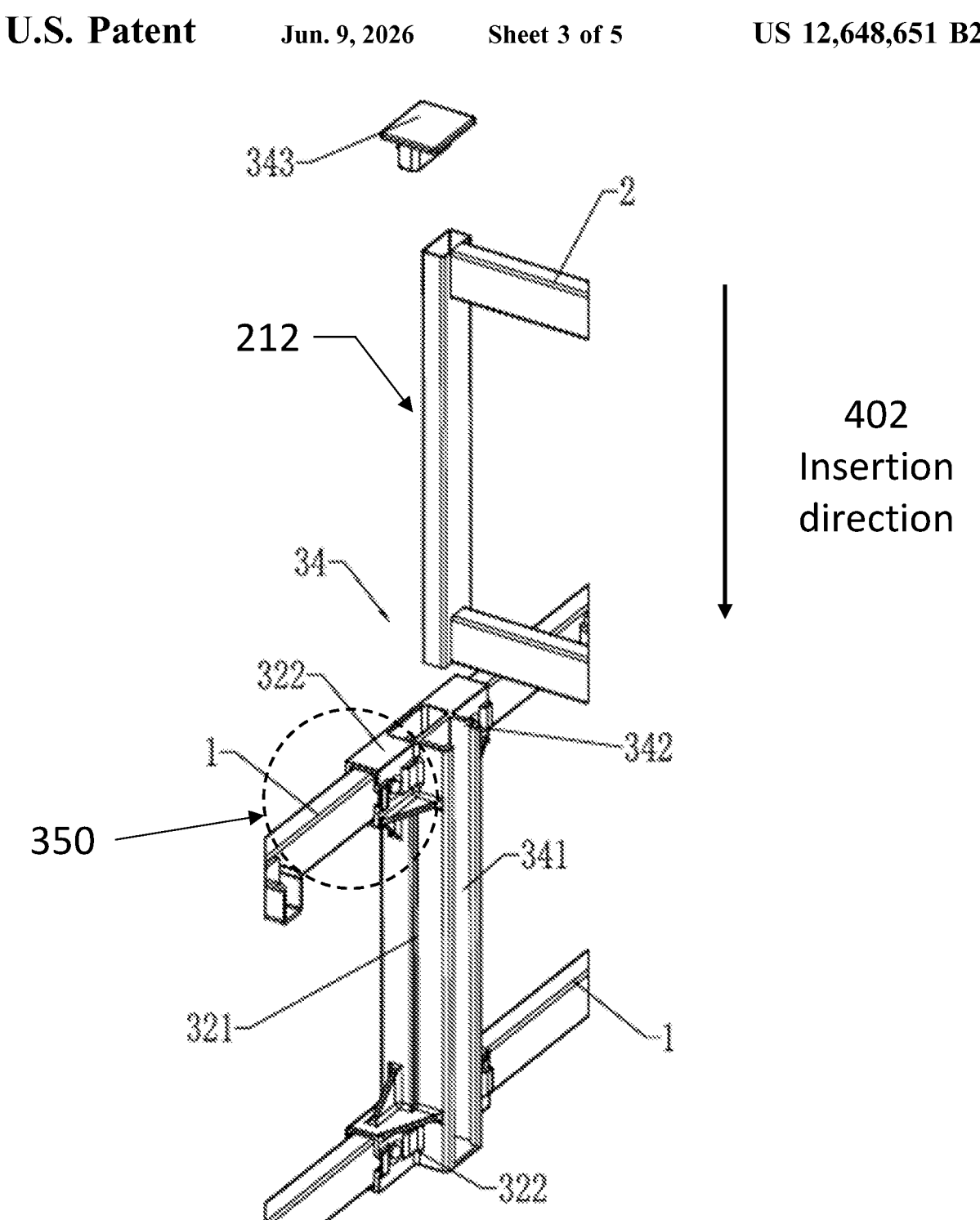
FIG. 3 schematically illustrates a perspective view of a second connector assembly of a mattress foundation of the present disclosure, according to one or more embodiments of the presented disclosure.

FIG. 3 schematically illustrates a perspective view of a second connector assembly of a mattress foundation of the present disclosure. As shown in FIG. 3, the second connector assembly 34 may comprise one or more end portions of the side frames 1, wherein the end portions of the side frames 1 may comprise a button portion 331 (not shown in FIG. 3). Additionally or alternatively, the second connector assembly 34 may comprise one or more end portions 212 of the middle frames 2 and the middle connector 32. The middle connector 32 may comprise a middle pole portion 321, and two horizontal pole portions 322, wherein the two horizontal pole portions 322 are coupled to, respectively, the top end and the bottom end of the middle pole portion 321, as shown in FIG. 3. In some embodiments, the middle pole portion 321 may have a height that is equal to the thickness of the mattress foundation. As shown in FIG. 3, element 350 illustrates an assembled state (also referred to as a coupled state, an inserted state, a deployed state, etc.) of the side frame 1 into one of the horizontal pole portion 322. The horizontal pole portion 322 may comprise the guiding paths 334, the receiving openings 332, and the apertures 333 (not shown in FIG. 3), similar to the structures illustrated in connection with FIG. 2. The end portion of side frame 1 may be inserted, via the guiding path 334, into the receiving opening 332, and secured by the button portion 331 of the side frame 1 and the aperture 333. As shown in FIG. 3, once secured together, the side frame 1 and the middle connector 34 may be in a state illustrated by element 350.

The middle connector 32 may comprise a receiving slot 341, wherein the receiving slot 341 may comprise a slot opening 342 to receive the end portion 212 of the middle frame 2 along the insertion direction 402. In some embodiments, the end portion 212 may slide into the receiving slot 341 along the insertion direction 402 via the slot opening 342. In some embodiments, the slot opening 342 may locate on one end of the receiving slot 341. For example, as shown in FIG. 3, the slot opening 342 locates on the upper end of the receiving slot 341. In some other embodiments, the slot opening 342 may locate on the lower end of the receiving slot 341. Alternatively or additionally, the slot opening 342 may locate on both ends of the receiving slot 341 (not shown in FIG. 3). The middle connector 32 may optionally comprise an end cap 343, wherein the end cap 343 may close the slot opening 342 and thereby secure the end portion 212 of the middle frame 2. In some embodiments, the middle connector 32 may not comprise the end cap 343. In some embodiments, as shown in FIG. 3, the dimension and shape of the end portion 212 of the middle frame 2 may be compatible with the receiving slot 341, i.e., the outer boundary of the end portion 212 may be slightly smaller than the inner boundary of the receiving slot 341. In some embodiments, the gap between the inner boundary of the receiving slot 341 and the outer boundary of the end portion 212 may be 0.1 mm, 0.2 mm, 0.3 mm, 0.4 mm, 0.5 mm, 0.6 mm, 0.7 mm, 0.8 mm, 0.9 mm, 1 cm, 2 cm, 3 cm, 4 cm, 5 cm, etc.

Figure 4:
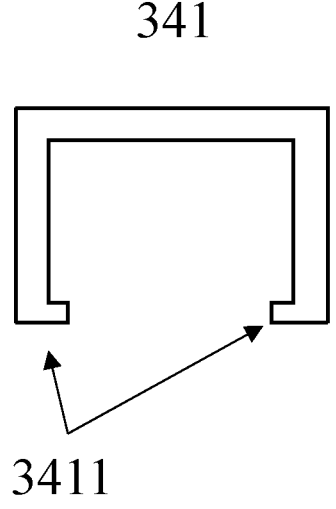
FIG. 4 schematically illustrates a top perspective view of a receiving slot of the middle connector and an end portion of the middle frame, according to one or more embodiments of the presented disclosure.
Figure 4:
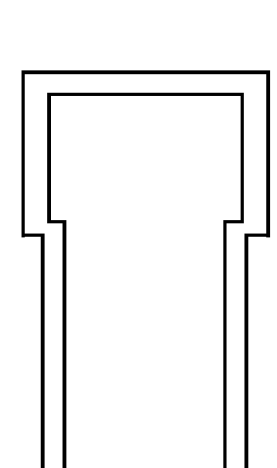

FIG. 4 schematically illustrates a top perspective view of the receiving slot 341 and the end portion 212 of the middle frame 2. As shown in FIG. 4, the end portion 212 of the middle frame 2 may have a cross-section with a shape that corresponds to the receiving slot 341's cross-section. In some embodiments, the receiving slot 341 may comprise one or more recessed elements 3411. Correspondingly, the end portion 212 of the middle frame 2 may be formed with a protrusion shape of cross-section portion. When inserted into the receiving slot 341, the end portion 212 may be locked into the receiving slot 341, along the horizontal direction, because of the corresponding shapes. The shapes of the receiving slot 341 and end portion 212 presented in FIG. 4 are solely for illustration purposes, other corresponding shapes may be utilized to secure the frames together.

Figure 5:
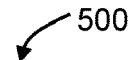
FIG. 5 schematically illustrates a perspective view of a connector portion of the first connector assembly and the second connector assembly, according to one or more embodiments of the presented disclosure.
Figure 5:
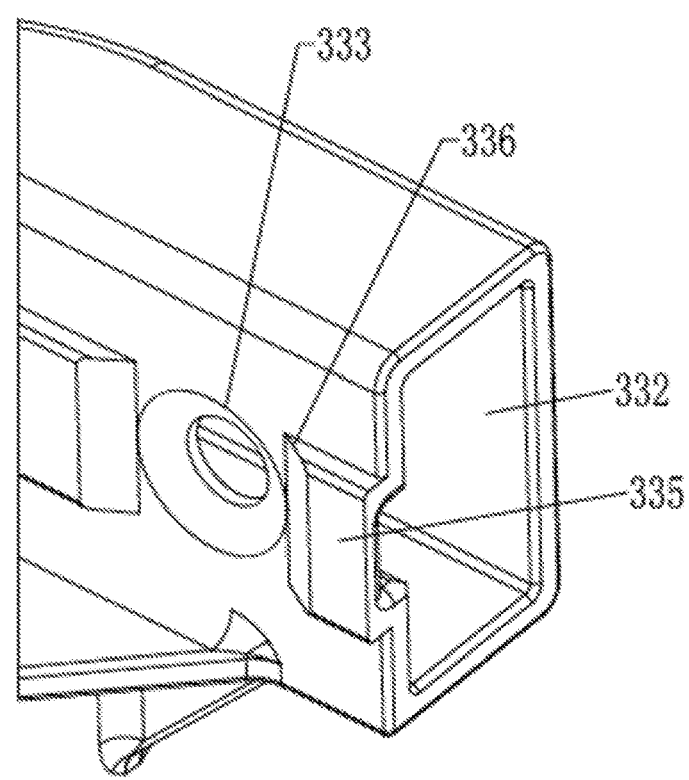

FIG. 5 schematically illustrates a perspective view of a connector portion 500 of the first connector assembly 33 and the second connector assembly 34, according to one or more embodiments of the presented disclosure. As shown in FIG. 5, the connector portion 500 may comprise receiving opening 332, apertures 333, a non-tilt guiding path 335, and a tilt guiding path 336. As shown in FIG. 5, the non-tilt guiding path 335 may locate by the edge of the receiving opening 332, and may link to the tilt guiding path 336 along the inward direction. When inserting the side frame 1 into the receiving opening 332, the button portion 331 (not shown in FIG. 5) may be aligned with the non-tilt guiding path 335 to provide easy alignment between the side frame 1 and the connector portion 500. Once button portion 331 passes the non-tilt guiding path 335 along the insertion direction, it reaches the tilt guiding path 336, wherein the tilt guiding path 336 may provide force pressing the button inward along the cross-section direction of the side frame 1. The button of the button portion 331 may be pressed inward and then released to extend outward through the aperture 333 due to the force from the spring portion of the spring button 331, thereby securing the side frame 1 and the connector portion 500 together. As shown in FIG. 5, the aperture 333 may have a tilt-in edge surrounding the opening, that may provide easement when dissembling the secured parts, for example, the tilt-in edge may provide extra room for pressing the button inward when dissembling the secured parts.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A mattress foundation structure, comprising:

one or more side frames, wherein the one or more side frames comprise one or more spring buttons; and one or more end connectors, wherein the one or more end connectors comprise a receiving opening and an aperture;

wherein the one or more end connectors are configured to removably couple to one or more side frames by inserting the one or more side frames into the receiving opening of the one or more end connectors and allow the one or more spring buttons to be released into the apertures to form a coupled state of the one or more side frames and the one or more end connectors; and wherein the one or more side frames are uniform in dimension along a cross-section direction of the one or more side frames without a necking portion, and wherein the receiving opening of the one or more end connectors comprises a cross-section with a dimension to receive the one or more side frames;

one or more middle frames comprising one or more end portions; and one or more middle connectors, each comprising a middle pole portion and two horizontal pole portions, wherein the two horizontal pole portions are coupled to a top and a bottom of the middle pole portion, and wherein the middle pole portion has a height equal to a thickness of a mattress foundation.

2. The mattress foundation structure of claim 1, wherein the one or more middle connectors further comprise a receiving slot, wherein the receiving slot has a hollow internal shape that is corresponding to a shape of the one or more end portions of the one or more middle frames, wherein the one or more middle connectors are configured to removably couple to one of the end portions of the one or more middle frames by sliding the end portion into the receiving slot of the one or more middle connectors.

3. The mattress foundation structure of claim 2, wherein the one or more middle connectors further comprise:

one or more receiving openings; and one or more apertures;

wherein the one or more middle connectors are configured to removably couple to the one or more side frames by inserting the one or more side frames into the one or more receiving openings and allow the one or more spring buttons to be released into the one or more apertures.

4. The mattress foundation structure of claim 2, wherein the receiving slot comprises a slot opening on one end of the receiving slot, wherein the slot opening is configured to receive the end portion of the one or more middle frames by facilitating the sliding the end portion from a top end to a bottom end of the receiving slot via the slot opening in a insertion direction such that the end portion of the one or more middle frames substantially fills the receiving slot, and wherein the slot opening is further configured to receive an end cap to close the slot opening.

5. The mattress foundation structure of claim 1, wherein the one or more end connectors further comprise a guiding path, wherein the guiding path is configured to provide alignment to insert the one or more side frames into the receiving opening.

6. The mattress foundation structure of claim 5, wherein the guiding path comprises a non-tilt guiding path and a tilt guiding path, wherein the non-tilt guiding path provides an initial alignment to insert the one or more side frames into the one or more receiving openings, and the tilt guiding path provides inward force pressing the one or more spring buttons, wherein the one or more spring buttons are released into the one or more apertures when the one or more side frame pass the tilt guiding path along an insertion direction.

7. The mattress foundation structure of claim 1, wherein the aperture has a tilt-in edge surrounding an aperture opening to provide extra room for application of force when dissembling the one or more side frames and the one or more end connectors from the coupled state, wherein the application of force pushes the one or more spring buttons inward to be lower than an aperture edge along the inward direction.

8. The mattress foundation structure of claim 1, wherein the receiving opening has a hollow internal shape that is corresponding to a cross-section shape of the one or more side frames.

9. The mattress foundation structure of claim 1, wherein the one or more end connectors are made of plastic.

10. The mattress foundation structure of claim 1, wherein the one or more middle connectors are made of plastic.

11. A connector assembly for a mattress foundation, comprising:

a spring button located on an end of a side frame of the mattress foundation, wherein the side frame is uniform in dimension along a cross-section direction of the side frame without a necking portion;

a receiving opening located on an end of an end connector of the mattress foundation, wherein the receiving opening is configured to receive the end of the side frame by insertion, wherein the receiving opening has a hollow internal shape that is corresponding to a cross-section shape of the side frame and a dimension to receive the end of the side frame;

an aperture located on the end of the end connector of the mattress foundation, wherein the aperture is configured to accommodate the spring button of the side frame when the side frame is inserted into the receiving opening;

one or more end portions located on one or more middle frames; and a middle pole portion and two horizontal pole portions, wherein the two horizontal pole portions are coupled to a top and a bottom of the middle pole portion, and wherein the middle pole portion has a height equal to a thickness of the mattress foundation.

12. The connector assembly of claim 11, further comprising a guiding path located on the end of the end connector of the mattress foundation, wherein the guiding path is configured to provide alignment to insert the side frame into the receiving opening.

13. The connector assembly of claim 12, wherein the guiding path comprises a non-tilt guiding path and a tilt guiding path, wherein the non-tilt guiding path provides an initial alignment to insert the side frame into the receiving opening, and the tilt guiding path provides inward force pressing the spring button, wherein the spring button is released into the aperture when the side frame passes the tilt guiding path along an insertion direction.

14. The connector assembly of claim 11, wherein the aperture has a tilt-in edge surrounding an aperture opening to provide extra room for application of force when dissembling the side frame and the receiving opening from a coupled state, wherein the application of force pushes the spring button inward to be lower than an aperture edge along the inward direction.

15. A connector assembly for a mattress foundation, comprising:

an end portion of a middle frame of the mattress foundation; and a receiving slot of a middle connector, wherein the receiving slot has a hollow internal shape that is corresponding to a shape of the end portion of the middle frames;

wherein the connector assembly is configured to removably couple to the end portion of the middle frame by sliding the end portion of the middle frame into the receiving slot of the middle connector, wherein the middle connector further comprises:

a receiving opening;

an aperture;

a middle pole portion; and two horizontal pole portions, wherein the middle connector is configured to removably couple to a side frame by inserting the side frame into the receiving opening and allow a spring button on the side frame to be released into the aperture, and wherein the two horizontal pole portions are coupled to a top and a bottom of the middle pole portion, and wherein the middle pole portion has a height equal to a thickness of the mattress foundation.

16. The connector assembly of claim 15, wherein the receiving opening is configured to receive an end of the side frame by insertion, wherein the receiving opening has a hollow internal shape that is corresponding to a cross-section shape of the side frame and a dimension to receive the end of the side frame; and wherein the aperture is configured to accommodate the spring button on the side frame when the side frame is inserted into the receiving opening.

17. The connector assembly of claim 16, further comprising a guiding path located on the middle connector, wherein the guiding path is configured to provide alignment to insert the side frame into the receiving opening.

18. The connector assembly of claim 17, wherein the guiding path comprises a non-tilt guiding path and a tilt guiding path, wherein the non-tilt guiding path provides an initial alignment to insert the side frame into the receiving opening, and the tilt guiding path provides inward force pressing the spring button, wherein the spring button is released into the aperture when the side frame passes the tilt guiding path along an insertion direction.

19. The connector assembly of claim 15, wherein the aperture has a tilt-in edge surrounding an aperture opening to provide extra room for application of force when disassembling the side frame and the receiving opening from a coupled state, wherein the application of force pushes the spring button inward to be lower than an aperture edge along the inward direction.

20. The connector assembly of claim 15, wherein the receiving slot comprises a slot opening on one end of the receiving slot, wherein the slot opening is configured to receive the end portion of the middle frame by facilitating the sliding the end portion from a top end to a bottom end of the receiving slot via the slot opening in a insertion direction such that the end portion of the one or more middle frames substantially fills the receiving slot, and wherein the slot opening is further configured to receive an end cap to close the slot opening.

* * * * *